(12) United States Patent
Zikeli et al.

(10) Patent No.: US 9,751,247 B2
(45) Date of Patent: Sep. 5, 2017

(54) EXTRUSION METHOD (75) Inventors: Stefan Zikeli, Regau (AT); Friedrich Ecker, Timelkam (AT)

(73) Assignee: AUROTEC GMBH, Voecklabruck (AT)

( * ) Notice: Subject to any disclaimer, the term of this patent is extended or adjusted under 35 U.S.C. 154(b) by 156 days.

(21) Appl. No.: 14/241,653

(22) PCT Filed: Sep. 3, 2012

(86) PCT No.: PCT/EP2012/067077
§ 371 (c)(1),
(2), (4) Date: Feb. 27, 2014

(87) PCT Pub. No.: WO2013/030399
PCT Pub. Date: Mar. 7, 2013

(65) Prior Publication Data
US 2014/0367879 A1 Dec. 18, 2014

(30) Foreign Application Priority Data

Sep. 2, 2011 (EP) .................................... 11179844

(51) Int. Cl.
*B29C 47/88* (2006.01)
*D01D 5/088* (2006.01)
(Continued)

(52) U.S. Cl.
CPC ........ *B29C 47/009* (2013.01); *B29C 47/0004* (2013.01); *B29C 47/0014* (2013.01);
(Continued)

(58) Field of Classification Search
CPC ... B29C 47/009; B29C 47/8895; B29C 47/92; B29C 47/864; B29C 47/862; B29C 47/30; B29C 47/0004; B29C 47/0021; B29C 47/0014; B29C 2947/92514; B29C 2947/92704; B29C 47/0076;
(Continued)

(56) References Cited

U.S. PATENT DOCUMENTS 4,728,473 A * 3/1988 Satoh ...................... D01F 6/605
264/101
4,880,469 A * 11/1989 Chanzy .................... D01F 2/00
106/200.2

(Continued)

FOREIGN PATENT DOCUMENTS

| WO | WO9738153 | * 10/1997 |
|---|---|---|
| WO | 02/18682 | 3/2002 |

*Primary Examiner* — Jeffrey Wollschlager
(74) *Attorney, Agent, or Firm* — Greer, Burns & Crain, Ltd.

(57) ABSTRACT

A method is provided for producing solid cellulose filaments or films from a solution of cellulose, NMMO (N-methylmorpholine-N-oxide) and water, including pressure-extruding the solution by one or more extrusion openings and by solidifying the filaments or films in a precipitation bath. The solution is guided between the extrusion opening and the precipitation bath by an air gap, the temperature of the solution on the extrusion opening being lower than 105° C. and the pressure difference in the air gap between the pressure of the solution immediately prior to extrusion and after extrusion is between 8 and 40 bar.

16 Claims, 4 Drawing Sheets

(51) Int. Cl.

| | | |
|---|---|---|
| *B29C 47/00* | (2006.01) | |
| *C08J 3/09* | (2006.01) | |
| *C08J 5/18* | (2006.01) | |
| *D01D 5/06* | (2006.01) | |
| *D01F 2/00* | (2006.01) | |
| *B29C 47/30* | (2006.01) | |
| *B29C 47/92* | (2006.01) | |
| *D04H 3/013* | (2012.01) | |
| *D04H 3/16* | (2006.01) | |
| *D01D 10/02* | (2006.01) | |
| *D01D 10/06* | (2006.01) | |
| *D01D 5/084* | (2006.01) | |
| *B29C 47/86* | (2006.01) | |
| *B29K 1/00* | (2006.01) | |
| *B29K 105/00* | (2006.01) | |
| *B29L 7/00* | (2006.01) | |
| *B29L 31/00* | (2006.01) | |

(52) U.S. Cl.
CPC .......... *B29C 47/0021* (2013.01); *B29C 47/30* (2013.01); *B29C 47/862* (2013.01); *B29C 47/864* (2013.01); *B29C 47/8895* (2013.01); *B29C 47/92* (2013.01); *C08J 3/096* (2013.01); *C08J 5/18* (2013.01); *D01D 5/06* (2013.01); *D01F 2/00* (2013.01); *D04H 3/013* (2013.01); *D04H 3/16* (2013.01); *B29C 47/0076* (2013.01); *B29C 47/866* (2013.01); *B29C 47/8875* (2013.01); *B29C 2947/92514* (2013.01); *B29C 2947/92704* (2013.01); *B29K 2001/00* (2013.01); *B29K 2105/0073* (2013.01); *B29L 2007/00* (2013.01); *B29L 2031/726* (2013.01); *B29L 2031/731* (2013.01); *C08J 2301/02* (2013.01); *D01D 5/084* (2013.01); *D01D 5/088* (2013.01); *D01D 10/02* (2013.01); *D01D 10/06* (2013.01); *D10B 2201/22* (2013.01)

(58) Field of Classification Search
CPC .. B29C 47/866; B29C 47/8875; D04H 3/013; D04H 3/16; C08J 3/096; C08J 2301/02; C08J 5/18; D01F 2/00; D01D 5/06; D01D 5/088; D01D 10/02; D01D 10/06; D01D 5/084; D10B 2201/22; B29L 2031/726; B29L 2031/731; B29L 2007/00; B29K 2105/0073; B29K 2001/00

See application file for complete search history.

(56) References Cited

U.S. PATENT DOCUMENTS

| | | | | |
|---|---|---|---|---|
| 5,085,774 | A * | 2/1992 | Ekiner | B01D 69/08 210/500.23 |
| 5,417,909 | A | 5/1995 | Michels et al. | |
| 5,589,125 | A * | 12/1996 | Zikeli | C08J 5/18 264/187 |
| 5,650,112 | A * | 7/1997 | Zikeli | D01D 4/02 264/187 |
| 5,698,151 | A * | 12/1997 | Zikeli | D01D 5/06 264/187 |
| 5,951,932 | A * | 9/1999 | White | D01D 5/06 264/187 |
| 6,093,355 | A * | 7/2000 | Newbury | C08J 5/18 264/187 |
| 7,922,943 | B2 * | 4/2011 | Gerking | D01F 2/00 264/40.1 |
| 8,303,888 | B2 * | 11/2012 | Brown | D01D 5/14 264/103 |
| 2003/0183976 | A1 * | 10/2003 | Hendriks | B29C 55/28 264/187 |
| 2005/0220916 | A1 * | 10/2005 | Zikeli | B60R 11/0241 425/71 |
| 2006/0099416 | A1 | 5/2006 | Kwon et al. | |
| 2006/0144062 | A1 * | 7/2006 | Zikeli | D01D 5/06 62/190 |
| 2009/0258562 | A1 * | 10/2009 | Brown | D01D 5/14 442/411 |
| 2011/0003148 | A1 * | 1/2011 | Lee | D01F 2/00 428/364 |

* cited by examiner

EXTRUSION METHOD

BACKGROUND

The present invention relates to extrusion methods, in particular for shaping polymer solutions or polymer fluids.

Cellulose and other polymers can be dissolved in suitable solvents and transferred by controlled solidification into a desired shaped article. If this shaped article is constituted by fibres, fibrils and the like, reference is also made to a spinning process. Cellulose is dissolved for example in aqueous solutions of amine oxides, in particular solutions of N-methylmorpholine N-oxide (NMMO), in order to produce spinning products, such as filaments, staple fibres, films, etc., from the obtained spinning solution. This occurs by precipitation of the extrudates in the water or diluted amine oxide solutions once the extrudates of the extrusion die are guided via an air gap into the precipitation bath.

U.S. Pat. No. 4,416,698 relates to an extrusion or spinning method for cellulose solutions in order to shape cellulose into fibres. In this case, a fluid spinning material—a solution of cellulose and NMMO (N-methylmorpholine N-oxide) or other tertiary amines—is shaped by extrusion and brought into a precipitation bath for solidification and expansion. This method is also known as the "lyocell" method.

U.S. Pat. No. 4,246,221 and DE 2913589 describe methods for producing cellulose filaments or films, wherein the cellulose is drawn in fluid form. These documents describe a spinning process in which cellulose is dissolved in tertiary amine oxide, wherein the obtained cellulose solution is pressed via a die, is extruded via an air gap into a spinning funnel, and is discharged at the end of the spinning funnel in the form of continuous fibre. The spinning funnel used is equipped with a feed means and a discharge means for the spinning bath.

A further method is described in U.S. Pat. No. 5,252,284, in which elongate shaping capillaries are used to shape a cellulose material.

WO 93/19230 A1 describes a further development of the lyocell method, in which the cellulose-containing spinning material is cooled immediately after the shaping process before introduction into the precipitation bath.

WO 94/28218 A1 describes a method for producing cellulose filaments, in which a cellulose solution is shaped into a number of strands via a die. These strands are introduced into a precipitation bath ("spinning bath") through a gap around which gas flows and are discharged continuously.

A shaping device and a further variant of the lyocell method are described in WO 03/057951, wherein the cellulose-containing spinning material, after shaping, is conveyed via a shielding region and then via a cooling region.

In EP 0 430 926 B1, a spinneret with a spinneret head and a spinning plate is presented, wherein the spinning plate consists of a stable carrier plate provided with bores. Spinneret plates, in which spinning capillaries are formed, are inserted into the aforementioned bores.

U.S. Pat. No. 5,951,932 A relates to a method for producing lyocell fibres with the known steps of extrusion of the cellulose fibres, passing of said fibres through an air gap with an airflow, and introduction into a precipitation bath. A range from 95° C. to 125° C. is mentioned as a possible temperature in the spinning cell. The extrusion pressure of some embodiments is to be between 20 and 100 bar. A pressure difference between the spinning material and the pressure in the air gap is not described. In addition, there is no information concerning the pressure and temperature at which extrusion is to be performed.

U.S. Pat. No. 5,417,909 A is a further document that describes a lyocell method. Temperatures between 70° C. and 115° C. are specified in examples 6 to 12. Lower spinning temperatures will demonstrate improved spinning behaviour. There is no information concerning pressure.

U.S. 2005/220916 A1 describes a lyocell spinning method with spinning temperatures between 80° C. and 102° C. No information concerning pressure is provided however.

DE 100 43 297 A1 specifies a spinning temperature of 85° C., but does not specify pressure.

The publication "The Temperature of Fibres during Air-Gap Wet Spinning: Cooling by Convection and Evaporation"—Volker Simon (Int. J. Heat Mass Transfer. Vol. 37, No. 7, pp. 1133-1142, 1994) presents courses of events in the spinning process. It is stated that the polymer material fed into the air gap contains water and that the water evaporates at the surface of the spinning fibre during the spinning process and this water evaporation has a cooling effect on the spinning fibre. It is concluded that the fibre temperature during extrusion is relatively high and the water concentration in the spinning environment is increased by the evaporation of the water from the fibre.

It is specified that the result is that the water vapour gradient causes the water vapour mass flow to be guided from the fibre in the direction of the surrounding environment. The water evaporation taking place in the filament is enabled by the quantity of water located in the filament, whereby a strong cooling effect, greater than with melt spinning, is produced. In a further statement, it is mentioned that the spinning material used in the NMMO method consists of a non-solvent (water), a solvent (amine oxide=NMMO) and cellulose. The author ultimately comes to the conclusion that the solvent does not evaporate during the shaping process.

SUMMARY

It has been found in accordance with the invention that the extrusion and subsequent cooling may lead to undesirable particle formation and deposits at the extrusion openings or to contaminations of the individual spinning fibres. For example, immediately after extrusion and cooling, individual constituents of the material to be shaped may thus break away in the form of solid particles from the spinning fibres, which are still fluid, and may damage the apparatus or compromise the quality of the product. The object of the present invention is to provide improved extrusion or spinning methods which can avoid these disadvantages.

The present invention therefore provides a method for producing solid cellulosic shaped articles, in particular filaments, staple fibres, films or non-woven fabrics, from a solution of cellulose, NMMO (N-methylmorpholine N-oxide) and water by extruding the solution through one or more extrusion openings under pressure and solidifying the shaped articles, in particular filaments, staple fibres, non-woven fabrics or films, in a collecting bath, wherein the solution is guided through an air gap between the extrusion openings and the collecting bath, wherein the temperature of the extrusion solution at the extrusion openings is below 105° C. and the pressure difference between the pressure of the spinning solution immediately before extrusion and after extrusion (in particular in the air gap) is between 18 and 40 bar. It has been recognised in accordance with the invention that, during the extrusion or spinning of cellulose shaped articles, not only is water separated from the shaped fluid in the air gap, but also particles of NMMO (N-methylmorpholine N-oxide) are formed as well as the NMMO degradation products NMM (N-methylmorpholine) and M (morpholine). These particles exiting from the polymer flow have a detrimental effect on the spinning method and not only damage the surface of the shaped articles, but also adhere to the extrusion openings and compromise the spinning fibres during the spinning method itself, wherein this may lead to spinning defects, fibre adhesions and fibre breaks. It has been recognised in accordance with the invention that the particle formation and the separation thereof from the extrudate is most pronounced at a processing temperature of the polymer solution from 105° C. to 110° C. The spinning solution is therefore extruded at lower temperatures in accordance with the invention. The restructurings in the spinning solution during the extrusion process, which leads to particle formation and for example can be determined by the enthalpy (FIG. 5), are reduced by the selection of lower temperatures. This process is additionally particularly pronounced during the transition of the spinning solution in the air gap from high pressures before extrusion to lower pressures after extrusion. Lower pressure differences, for example in the range from 8 to 40 bar, are therefore implemented in accordance with the invention.

In preferred embodiments the temperature of the solution is between 80° C. and 98° C., preferably between 84° C. and 96° C. The temperature may be at least one of 80° C., 81° C., 82° C., 83° C., 84° C., 85° C., 86° C., 87° C., 88° C., 89° C. or 90° C. The temperature is preferably at most one of 104° C., 103° C., 102° C., 101° C., 100° C., 99° C., 98° C., 97° C., 96° C., 95° C., 94° C., 93° C., 92° C., 91° C., 90° C., 89° C. or 88° C. The particle formation can be reduced and the spinning behaviour therefore improved by each temperature reduction.

The pressure difference is preferably between 10 bar and 38 bar, in particular between 13 bar and 35 bar. More specifically, the pressure difference may be at least 8 bar, 9 bar, 10 bar, 11 bar, 12 bar, 13 bar, 14 bar, 15 bar, 16 bar, 17 bar, 18 bar, 19 bar, 20 bar, 21 bar, 22 bar, 23 bar, 24 bar, 25 bar, 26 bar, 27 bar, 28 bar, 29 bar, 30 bar or more. Low pressure differences are particularly preferably selected, for example of at most 40 bar, 39 bar, 38 bar, 37 bar, 36 bar, 35 bar, 34 bar, 33 bar, 32 bar, 31 bar, 30 bar, 29 bar, 28 bar, 27 bar, 26 bar, 25 bar or less.

The pressure of the spinning solution (spinning fluid) immediately before extrusion, for example the pressure in an extrusion chamber upstream of the extrusion openings, in specific embodiments may be between 13 and 50 bar, preferably between 14 and 49 bar, between 15 and 48 bar, between 16 and 47 bar, between 17 and 46 bar, between 18 and 45 bar, between 19 and 44 bar, between 20 and 43 bar, between 21 and 42 bar, between 22 and 41 bar, between 23 and 40 bar, between 24 and 39 bar, between 25 and 38 bar or between 26 and 37 bar.

The pressure after extrusion, for example in the air gap, is usually at ambient pressure, but may also be a negative pressure or overpressure. The pressure difference is preferably selected such that the differences between the deformation enthalpy of the cellulose/NMMO/water solution following the pressure expansion are lower at the spinning temperatures. For example, the pressure may be between 0.1 bar and 10 bar. The pressure after extrusion is preferably at least 0.5 bar, particularly preferably at least 1 bar, 2 bar, 3 bar, 4 bar, 5 bar, 6 bar, 7 bar, 8 bar, 9 bar, 10 bar or more. Here, in specific embodiments, the pressure may be at most 10 bar, 9 bar, 8 bar, 7 bar, 6 bar, 5 bar, 4 bar, 3 bar, 2 bar, 1.5 bar, 1 bar or less. A shaping process of this type with overpressure in the air gap can be performed in a pressure vessel. The shaped articles are preferably produced discontinuously in this pressure vessel and are removed after a specific produced quantity by opening the pressure vessel. In this case, the medium in the collecting bath, for example water, can also be replaced discontinuously, since NMMO and the decomposition products can collect during the spinning process. With an excessively high NMMO concentration in the collecting bath, the solidification of the shaped articles could be compromised. Alternatively, the medium can be introduced and removed continuously into/from the pressure vessel by overpressure, as is the case with processes at normal pressure.

In preferred embodiments a lateral gas flow is provided in the air gap. The gas flow is used to discharge from the spinning chamber any particles that separate from the polymer material (cellulose/amine oxide/water) and potentially also to cool the spinning fibres before entry into the collecting bath (spinning bath) in which the fibres are ultimately solidified by precipitation of the polymer cellulose. The gas flow can be divided twice or more into individual partial flows, possibly by flowing through a number of nozzle openings. One or more partial flows can be heated (hot partial flow) or cooled (cold partial flow). For efficient discharge of the particles, at least one hot partial flow is provided at a temperature greater than the melting point of the particles (NMMO in the form of adsorbed water of hydration), for example above 75° C. The hot partial flow is preferably adjacent to the extrusion openings, with the result that the extruded solution first passes by the hot partial flow and then the other (cold) partial flows in order to avoid in particular particle adhesion to the extrusion device and crystallisation of the particles. Crystallisation of the particles in the region of the extrusion openings would cause the solids (particles) thus produced to negatively influence the course of the spinning process in the air gap, and would also cause the crystallisation heat produced to be introduced into the extrusion area, which is likewise counterproductive to an optimal shaping process. The gas is preferably air or an inert gas which does not react with the spinning solution or the separated particles or is suitable to lead away a resulting crystallisation enthalpy. The gas flow can be introduced into the air gap by a fan or a fan device, possibly with a flow-guiding arrangement. A further flow-guiding arrangement may also serve to discharge the gas flow in a controlled manner from the spinning region or air gap.

In preferred embodiments of the invention, one or more components (such as NMMO) solubilising the cellulose is/are therefore separated from the extruded solution, preferably by the gas flow fed laterally. In particular, the components separated by the laterally fed gas flow can be discharged from the spinning field on the flow-off side. The discharge components are preferably components that can be crystallised, in particular those that can crystallise out from the cellulose solution in the event of cooling processes or pressure changes in the air gap.

The gas flow is preferably between 30 to 300 liters/h of gas per mm of length of the region of the extrusion openings in the gas flow direction or between 0.15 and 20 liters/h of gas per $mm^3$ of spinning field volume in the air gap. The gas flow, in preferred embodiments, may also be between 40 to 275 liters/h, 50 to 250 liters/h, 60 to 225 liters/h, 70 to 200 liters/h, 80 to 175 liters/h, 90 to 150 liters/h or 100 to 130 liters/h of gas per mm of length of the region of the extrusion openings in the gas flow direction. Dimensioned alternatively, the gas flow may preferably be between 0.15 and 20 liters/h, between 0.25 and 18 liters/h, between 0.4 and 16 liters/h, between 0.5 and 14 liters/h or between 0.6 and 12 liters/h of gas per mm³ of spinning field volume. These gas flows are either the individual flows of 2, 3, 4, 5 or 6 partial flows or the total flow through the air gap. The region between the extrusion openings and the collecting bath is preferably flushed substantially completely by the lateral gas flow in order to discharge particles along the entire length and width of the spinning fibres. The lateral gas flow is preferably laminar in order to avoid swirls, which only discharge the particles inefficiently.

A plurality of extrusion openings may be provided in the direction of the lateral gas flow, the gas flow flushing over all extrusion openings in succession.

As already noted, a partial flow of the lateral gas flow is preferably heated, preferably by an extrusion plate comprising the extrusion openings and/or by a heating element in a fan, in order to prevent particles separating from the polymer solution (cellulose/amine oxide/water) from crystallising out at the extrusion openings from the spinning solution or the formed fibres after the extrusion process and in order to avoid deposits at the extrusion openings or on the spinning fibres. These particles are generally crystallisation products or decomposition products, which can be discharged at increased temperature in order to avoid a deposition and the feeding of crystallisation heat by direct cooling. The cold partial flow is a cold partial flow of the gas, for example at air temperature. The temperature of the hot partial flow is preferably above the melting point of the expected particles. In the case of a spinning fluid of cellulose-NMMO-water, which is normally extruded at temperatures from 80° C. to 105° C., particles formed from NMMO hydrate are anticipated. The hot partial flow should therefore have a temperature of at least 75° C. The region of the cold partial flow and of the hot partial flow border on one another directly, with the result that the extruded solution experiences no considerable turbulences or differences in the gas flow velocity in the direction of extrusion. A gentle transition into the cold flow region is thus attained, and the depositions and breaking out of solidified particles from the polymer solution is prevented. In the cold partial flow, the tackiness of the solution still in the fluid phase between the extrusion openings and the collecting bath (a "precipitation bath" for solidification of the solution) is reduced. This cooling is not to take place immediately after the extrusion openings however, since it has been found that depositions and blockages of the openings may occur as a result and that, as has been demonstrated in accordance with the invention, the solvent constituents escaping from the polymer material by expansion evaporation could crystallise if cooled directly and could lead to an undesirable input of heat. In particular, it has been found that even a heating in this region in front of the openings is advantageous. It has also been demonstrated in the tests that a certain covering or flow-guiding element of the collecting bath surface is advantageous so that moisture is not introduced into the spinning field via the collecting bath. The cover may be positioned at a suitable angle to the direction of extrusion and collecting bath surface so that the extrusion process can be designed optimally.

The hot partial flow is preferably passed by the extrusion openings at hot temperatures with a difference from the temperature of the solution of at most 20° C., in particular preferably at most 10° C. or 5° C. The temperature of the cold partial flow is preferably between 0 and 50° C.

The embodiments of the present invention are specifically characterised by a controlled flow of gas through the region between the extrusion opening and collecting bath. Individual gas-guiding regions, in particular for the hot partial flow and the cold partial flow, are formed by controlled flow introduction. The individual partial flows of the gas flow, in particular of the hot partial flow and of the cold partial flow, are passed by the extruded polymer solution at substantially the same speed. The direction of extrusion is approximately normal to the direction of flow of the gas. The gas flow is fed only from one side onto the shaped solution containing cellulose material.

The region between the extrusion opening and collecting bath, the solution still being fluid in this region, is also referred as the liquidus region. The solution is solidified by entry into the collecting bath. Reference is made to a solidus region. In accordance with the invention, there is preferably no provision of shielding regions without gas flow in the liquidus region.

To attain a laminar gas flow along the extrusion device, a guide element may be provided. The gas flow may thus be guided in a laminar manner along the extrusion openings, even if it is guided over a curved path (for example with a curved or arched extrusion opening region on the extruder or spinning device). The gas flow is generally also guided over a curved path above the collecting bath, above the solidus line, depending on the gas flow via the extrusion device.

The region between the extrusion openings and the collecting bath is preferably flushed substantially completely by the lateral gas flow. Turbulences at the edges of the gas flow are thus avoided. The feedthrough of the shaped material through various gas zones at different flow rates, including stationary gases, is also avoided.

The fan or the introduced gas flow is preferably arranged at an acute angle to the direction of extrusion. The gas flow obtains a flow component in the direction of extrusion at an angle slightly inclined with respect to the direction of extrusion, whereby a gentler progression of the solidifying solution is attained. The extrusion device likewise has to be adapted to the flow guidance, with the result that a slight inclined position of the extrusion device is advantageous. This is a further measure in order to prevent solidifying particles from separating from the solution flow. The spinning viscosity of the extrudates can also be influenced to a certain extent by the inclined position of the extrusion device, since extrudates positioned on the gas onflow side experience a quicker viscosity change than extrudates positioned on the exhaust gas side. Due to a suitable guide element, the gas can be guided in a laminar manner around the extrusion device in spite of the inclined onflow direction. Suitable guide elements are, for example, baffle plates or vents, with or without vacuum/suction. The gas flow can be directed onto the collecting bath at an acute angle, with the result that a dynamic pressure is created on the onflow side. The surface of the medium can thus be plunged in the collecting bath/precipitation bath. The spinning fibres on the onflow side are thus exposed to the gas flow for longer than the fibres on the flow-offside. For example, the acute angle may be less than 85°, in particular less than 80°, less than 75°, less than 70°, less than 65°, less than 60° or less than 55°. The acute angle is preferably at least 30°, at least 35°, at least 40°, at least 45°, at least 50°, at least 55°, at least 60°, at least 65°, at least 70° or at least 75°. In addition, a dynamic pressure is produced at the surface of the collecting bath due to this acute angle of the fan arrangement, whereby the medium contained in the bath decreases on the fan side/onflow side. Different residence times are thus produced in the fan flow for the fluids (spinning fibres) on the onflow side and on the flow-off side. This optimises the different residence times with different viscosities of the fluids due to different temperatures on the onflow side (generally cooler) and on the flow-off side (warmer due to the cold gas flow heated by the fluid).

In addition, it is possible to allow the extruded fluid to flow at an acute angle onto the collecting bath. Due to due extrusion openings (spinneret) arranged in such an inclined manner, the spinning fibres experience different residence times in the gas flow region from the fan on the flow-off side and on the onflow side. On the onflow side, the temperature in the fibres is much lower than on the flow-off side, whereby different viscosities of the cellulose fluid are produced. These residence times are preferably longer in the case of higher viscosity (generally on the onflow side) than with lower viscosities (generally on the flow-off side). The acute angle is preferably at least 10°, at least 20°, at least 30°, at least 40°, at least 50°, at least 60°, at least 70°, at least 80°, or less than 85°, in particular less than 80°, less than 75°, less than 70°, less than 65°, less than 60° or less than 55°. The angle is preferably between 10° and 45°.

Before the extrusion through the extrusion openings, the solution can be collected and/or temperature-controlled in an extrusion chamber. Additives of different chemical and physical origin can also be added to the solution before extrusion, for example in the chamber. The extrusion chamber is preferably heated by a heating element, for example by a heat transfer medium, which is guided in heating channels. This heating element or a further heating element can also be used to heat the extrusion openings. The openings can be formed in an extrusion plate, which preferably has a heating element. The coefficient of thermal conduction of the extrusion plate is preferably in the region of the coefficient of thermal conduction of metals, for example it may be between 5 to 100 W/mK, preferably 10 to 60 W/mK. The extrusion plate and the material of the fan (in particular the partition walls between the individual discharge openings of the fan), can be produced from different materials, such as steel, high-grade steel, ceramic, sintered metals, aluminium, plastic, non-ferrous metals or noble metals. Preferred materials are all irons, iron alloys, chromium-nickel steels, nickel steels (for example Hastelloy materials), titanium, tantalum, silicon carbide, glass, ceramic, gold, platinum and also plastics. Special materials are alloys having a high molybdenum content or nickel, chromium and molybdenum alloys for resistance to pitting and crevice corrosion or nickel-copper alloys with high tensile strength. Material examples include Hastelloy C (high resistance to corrosion), Hastelloy B (precipitation-hardening high-temperature alloy), Inconel (resistance to stress corrosion cracking in petrochemical applications), Incoloy (high strength and resistance with respect to high temperatures and with respect to oxidation and carburisation) and Monel (high tensile strength, resistant to corrosion). A material having a thermal conductivity from 5 to 100 W/mK, particularly preferably from 10 to 60 W/mK, is preferably selected.

The extrusion plate can be fastened arbitrarily to the extrusion device, including by means of detachable fastenings for easy exchange of the plate. The plate can also be welded on, glued on or flanged on or fastened by clamps or rivets. The extrusion plate may also be coated, in particular to repel the extruded material or the particles separating from the polymer material or for improved transfer of heat.

The extrusion plate preferably has a thickness of at most 20 mm, particularly preferably at most 15 mm, at most mm, at most 10 mm or at most 8 mm. The extrusion openings formed in the extrusion plate are formed via specially designed spinneret plates, wherein the spinneret plates have a thickness of at least 0.25 mm; 0.5 mm; 0.75 mm; 1.0 mm; 1.25 mm; 1.5 mm; 2.0 mm; 3.0 mm; and/or at most 1.0 mm; 1.25 mm; 1.5 mm; 0.2 mm or 3.0 mm.

The heated partial flow is preferably heated by an extrusion plate comprising the extrusion openings and/or by a heating element.

The fan preferably contains a plurality of discharge openings for the gas flow. For example, a plurality of channels may be provided in the fan for this purpose. These channels are preferably arranged in a close-fitting manner, for example in a honeycomb form. To create a hot partial flow, one side of the fan may be heated, wherein the heat for heating may be passed on to a certain extent through the separations between the channels, continuously in a decreasing manner. The channels which lead to the cold partial flow should thus remain largely unheated or should be heated to the desired low temperature.

A plurality of extrusion openings is preferably provided in the direction of the lateral gas flow. The extrusion openings can be provided on a cambered, that is say curved, extrusion plate, wherein the angle of curvature a at the edge of the extrusion plate to the direction of extrusion is an acute angle. The angle of curvature a is preferably less than 85°, in particular less than 80°, less than 75°, less than 70°, less than 65°, less than 60° or less than 55°. This embodiment is preferably combined with the aforementioned guide element to remove and/or feed the gas flow. The gas flow is thus guided along the extrusion plate along the cambered or curved region. The profile of the formation of the extrusion openings can be adapted by a curvature to the profile of the surface of a liquid in the collecting bath. By flowing the solution into the collecting bath, the surface of the liquid is curved there, whereby, with a flat guidance of the extrusion openings, the middle material jets require a longer travel time than the outer material jets. Inhomogeneities may thus be produced by different residence times in the cold partial flow. These are avoided in accordance with the invention.

The solution, which is shaped in accordance with the invention by extrusion, is a viscous fluid, as described in U.S. Pat. No. 4,416,698 or W003/057951 A1. Cellulose solutions in the range from 4 to 23% cellulose are preferably used for the processing into extrusion products. The spinning solution preferably consists of the following components: cellulose 10-15%, amine oxide (NMMO=N-methylmorpholine N-oxide 77-75%), water 12-9%.

When carrying out the method according to the invention, besides the reagents stabilising the spinning solution, such as gallic acid propyl ester in alkaline spinning material, the spinning solution may also be mixed with additional additives for setting specific product properties by means of incorporation, said additives being used in textile and technical fibre processing. Such additives may be: matting means ($TiO_2$), contrast media ($BaSo_4$), activated carbon or soot particles, silicon dioxide ($SiO_2$), dyes, cross-linking agents, higher-order alcohols for setting the slip properties of the spinning solution or for improving and/or delaying the coagulation behaviour of the dissolved cellulose in the collecting bath, biopolymers of any type, naturally occurring polyaminosaccharides, carbohydrates and proteins as well as minerals and vitamins, and organic and inorganic materials suitable for ion exchange. Furthermore, the method according to the invention may also be implemented with polymer mixtures based on biopolymers and synthetically produced polymers.

Additives which lower the melting point of NMMO hydrate crystals are preferably added. Such additives are, for example, polymers such as PEG or chaotropic substances. The spinning solution may thus be kept at even lower temperatures during the spinning or extrusion method according to the invention, which more effectively avoids the particle-forming processes. Due to suitable additives, the temperature of the solution at the extrusion openings may also be between 70° C. and 80° C., preferably at least 71° C., at least 72° C., at least 73° C., at least 74° C., at least 75° C., at least 76° C., at least 77° C., at least 78° C., at least 79° C. or at least 80° C., or at most may be at the temperatures already mentioned, but also at most 87° C., at most 86° C., at most 85° C., at most 84° C., at most 83° C., at most 82° C., at most 81° C. or at most 80° C.

The discharge openings can be selected in any form in order to shape the solution. Elongate openings for shaping films or small, round openings for shaping filaments or fibres are possible. The openings are preferably at most 2 mm, at most 1.5 mm, at most 1.2 mm, at most 1.1 mm or at most 1 mm narrow or in diameter. The openings may be at least 0.05 mm; at least 0.075 mm; at least 0.1 mm, at least 0.2 mm, at least 0.3 mm, at least 0.4 mm, at least 0.5 mm, at least 0.6 mm, at least 0.7 mm, at least 0.8 mm or at least 0.9 mm narrow or in diameter. After the discharge, the solution is indeed in the shaped state, but is still in fluid phase and is located in the liquidus zone.

Media, liquids and/or temperatures in/at which the solution solidifies can be provided in the collecting bath. For example, liquids or solutions can be used in which the cellulose is not soluble and thus precipitates. Alternatively or additionally, lower temperatures can be selected, at which the cellulose solidifies in the solidus zone. The filaments, staple fibres, fibres or films according to the invention can be produced by precipitation that is continuous at least occasionally. The filaments, staple fibres, fibres or films can be discharged continuously or discontinuously from the collecting bath. The medium or the liquid in the collecting bath may also be renewed continuously or discontinuously. The temperature of the collecting bath can be controlled to a specific temperature, for example by heating or cooling elements or by control of the medium change.

BRIEF DESCRIPTION OF THE DRAWINGS

The present invention will be illustrated further by the following figures and examples without being limited to these specific embodiments of the invention.

Extrusion openings are illustrated by points, from which spinning fibres (not illustrated) exit. A spinning gas volume of which the nature is measured and influenced in accordance with the invention is defined around the fibres.

FIG. 4 shows the measured particle size distribution (Dp) as a function of the number of particles. The individual superimposed curves show the distribution from the largest distance between the probe and the collecting bath (upper curve) to the smallest distance (lowermost curve). The frequency of the particles increases with greater distance from the spinneret.

DETAILED DESCRIPTION

EXAMPLE

Figure 1A:
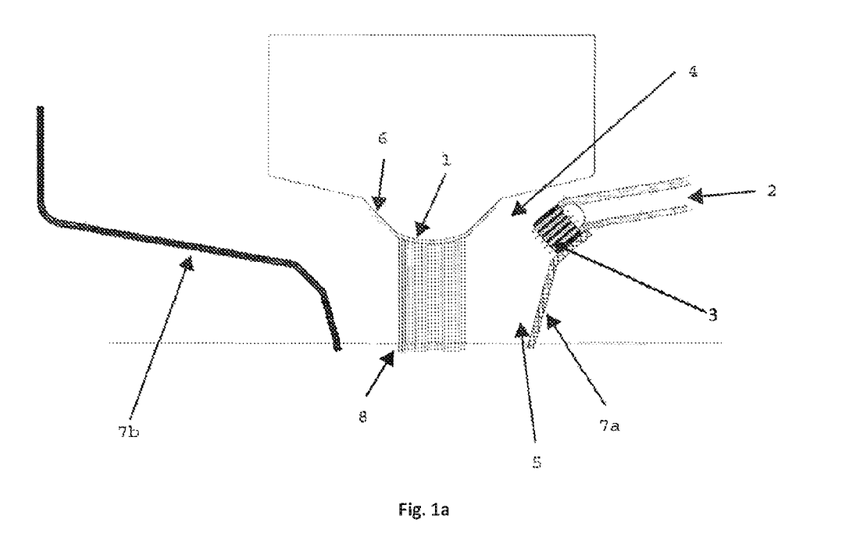
FIG. 1 shows an extrusion device with extrusion openings 1 and a fan 2 with gas flow discharge openings 3. The extrusion openings 1 are provided on an extrusion plate 6 that is curved in the direction of the gas flow. The entry into a collecting bath is denoted by point 8. The extrusion device further has flow-guiding elements 7, which can be provided on the onflow side (a) and/or on the flow-off side (b). The flow-guiding element, besides the gas flow guidance, has a second purpose, specifically the covering of the collecting bath, such that the transfer of moisture of the collecting bath into the spinning field is reduced.
Figure 1B:
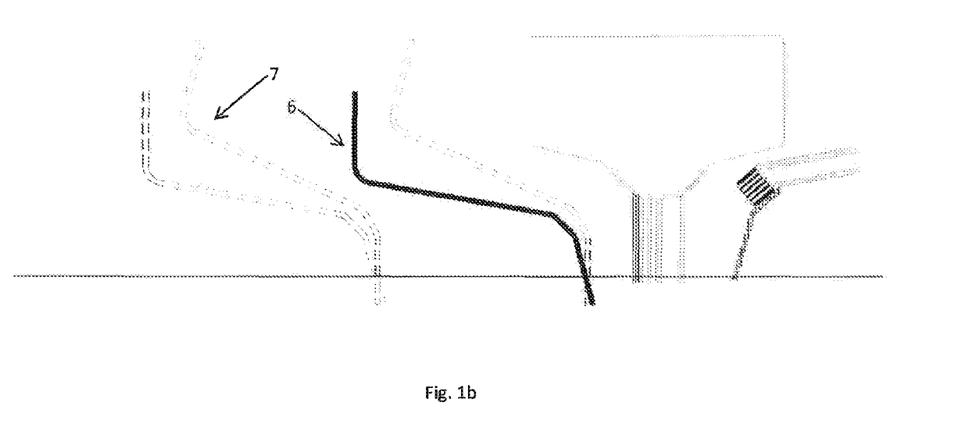
FIG. 1b shows different alternative positions for the flow-guiding element 7b.
Figure 2:
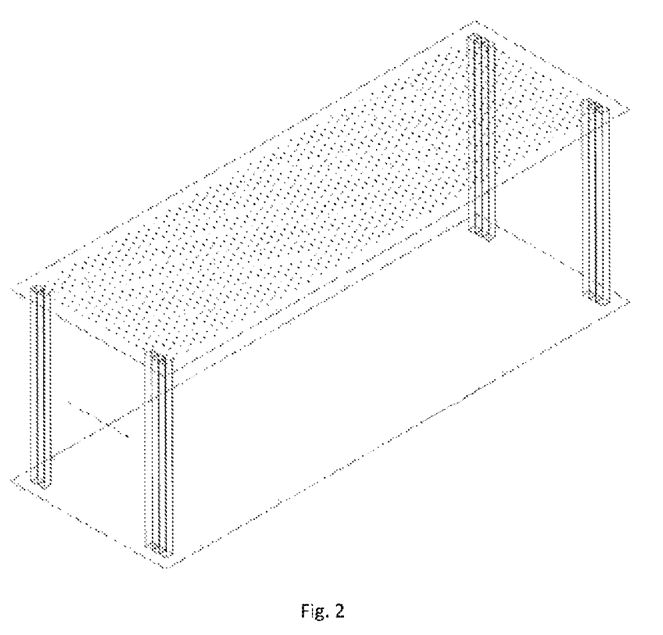
FIG. 2 shows a three-dimensional illustration of a spinning field of an extrusion device with an air gap.

In accordance with this example, an extrusion device as illustrated in FIG. 1 is used. In this form, an extrusion device contains an extrusion plate 6, which is curved in the direction of the gas flow, with a profile at extrusion openings 1 which reproduces the profile of the surface of a water bath as a collecting bath when the material fluid flows thereinto. As a result of extrusion under pressure, the material fluid is shaped by the shape of the extrusion openings, for example into filaments, and is drawn further by passing through the gas flow. As a result of cooling, the tackiness is reduced in order to prevent adhesion upon entry into the water bath.

During operation, an extrusion device according to FIG. 1 was tested when spinning cellulose filaments with a cellulose-NMMO-water solution.

Example 1

Analysis of the Conditions in the Air Gap

A spinning solution (cellulose: 12.9%, NMMO 76.3%, water 10.8%, all % in % by weight) is produced by mixing an aqueous amine oxide solution and cellulose by removing excess water in an evaporation process upstream of the spinning process, wherein the cellulose (the polymer) dissolves in the concentrated solvent to form a polymer material. Already during this solution production process, which is carried out at negative pressure, it was established that NMMO, NMM (N-methylmorpholine=decomposition product of NMMO) and M (morpholine=decomposition product of NMMO and NMM, NMMO=N-methylmorpholine N-oxide) and also water can be separated in the evaporation process via the gas phase.

The spinning process results in expansion evaporation as a result of the extrusion of the spinning material because the spinning material fed to the extrusion nozzle is under a suitable conveying and extrusion pressure and this extrusion pressure is decreased to the ambient pressure of the system once the respective melt particle has exited from the spinneret bore. Spinning pressures up to 250 bar are usual in a spinning method, depending on the composition (cellulose concentration of the spinning solution). Due to the previously mentioned expansion evaporation or due to the pressure relief of the spinning solution from the high pressure level, at temperatures from 90 to 110° C., to a low pressure level (lower ambient temperature), a violent bubbling movement of the solubilising components (NMMO and $H_2O$) is produced in the filament. The vapour bubbles forming rise from the cellulose solution (flash vaporisation). The escaping particles therefore enter the air gap space in a highly accelerated manner.

Due to the expansion (evaporation of the solubilising components), the energy necessary to evaporate the solubilising components is removed from the spinning solution flow, wherein the filament cools by itself as a result of the energy withdrawal. It has surprisingly been found that not only water (Simon, Int. J. Heat Mass Transfer. Vol. 37, No. 7, pp. 1133-1142, 1994), but also NMMO, NMM and M are evaporated from the spinning solution.

Since the composition of the solubilising component in the spinning solution (NMMO hydrate) is at such a ratio that the evaporated solubilising component (NMMO hydrate) transitions into the crystal form at temperature conditions below 75° C., the particle formation was observed during and after the spinning process and an attempt was made to control this by modifying the process parameters in order to provide a microclimate in the air gap region for an optimally progressing spinning process.

Aerosols and crystals transported away can be easily determined in the flow-off region of the spinneret and are not present in the onflow region of the nozzle. These aerosols, besides the gaseous components, such as air ($O_2$ and $CO_2$), CO, NMM and M, also consist of the NMMO hydrate compound formed (monohydrate). It is known that there are various forms of NMMO in the form of adsorbed crystallisation water.

Sampling from the Spinneret Flushing Gas:

The spinning gas was sampled as representatively and loss-free as possible on the exhaust air side, which is charged with aerosols. This was achieved using a measuring probe, wherein the probe was designed in accordance with VDI2066. The design was implemented individually so that isokinetic sampling was ensured.

Figure 3:
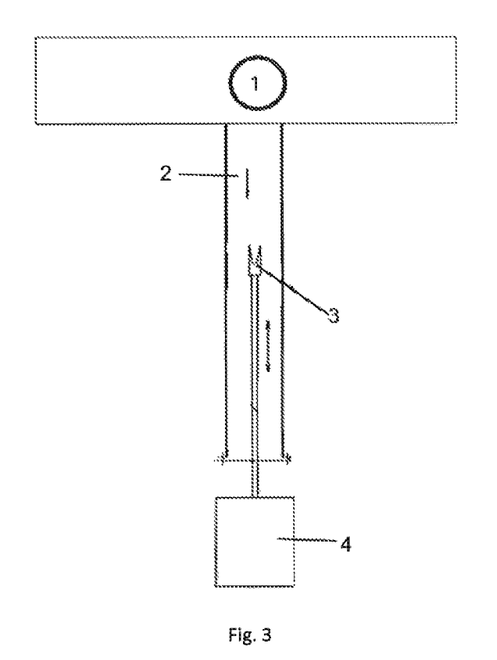
FIG. 3 shows a device for particle measurement comprising a spinneret 1, the indicated direction of flow of the spinning material 1, a sampling probe 3 and a particle counter 4.

The sampling line was introduced beneath the spinneret, wherein the positioning of the probe was varied over the height of the air gap and over the distance between the sampling probe and the nozzle midpoint. FIG. 3 shows the measuring arrangement.

Carrying Out the Measurement:

The measurement of the aerosol ejected from the spinning process was carried out using an optical particle counter of the SMPS type (Scanning Mobility Particle Sizer™ Spectrometer) by TSI.

With this method, the particles are electrically charged and are then fractionated in a differential mobility analyser (DMA). The fraction is counted using a condensation core counter. In principle, any fractions can be isolated from the aerosol and counted by varying the control voltage at the DMA. The entire distribution is thus obtained gradually.

The condensation core counter can detect particles from approximately 3 nanometers in diameter. With regard to particle size, the system is limited upwardly to approximately 1 micrometre of particle diameter.

Sampling was performed in accordance with VDI 2066 using a probe which was fabricated from steel (1.4301) and which was encased and designed as a counterflow heat exchanger. Temperatures between 0° C. and 60° C. were able to be set, wherein the drawn spinning gas volume flow rate was set between 3 m/s and 4 m/s.

The air feed at the spinneret was arranged closely along the longitudinal side of the nozzle and screened the spinneret from the side so that transverse flows by drag could be excluded.

The precipitation bath surface was also covered laterally and on top on the onflow side and also on the flow-off side so that no moisture could be drawn during the measurement.

Filter measurements were also performed for the chemical analysis of the drawn aerosol product in order to analyse the particles in terms of mass in addition to the size analysis. PTFE membranes with pore diameters from 200 to 300 nanometers were used for the filter measurements.

The temperature of the measuring probe was set to 18° C., and in any case so high that no crystallisation of water contained in the air was possible, so that the measurement result could not be falsified. In this case, the spinning gas temperature was approximately 60° C. The probe was not cooled any lower in order to avoid condensate and crystallisation formation as detailed above as a result of drawn moisture from the ambient air, since, in accordance with the thesis forming the basis of the invention (separation of NMMO monohydrate crystals from the spinning polymer solution), a feed of moisture via condensate formation would have led to the dissolution of the NMMO monohydrate crystals and it would not have been possible to measure the particle size and number.

Figure 4:
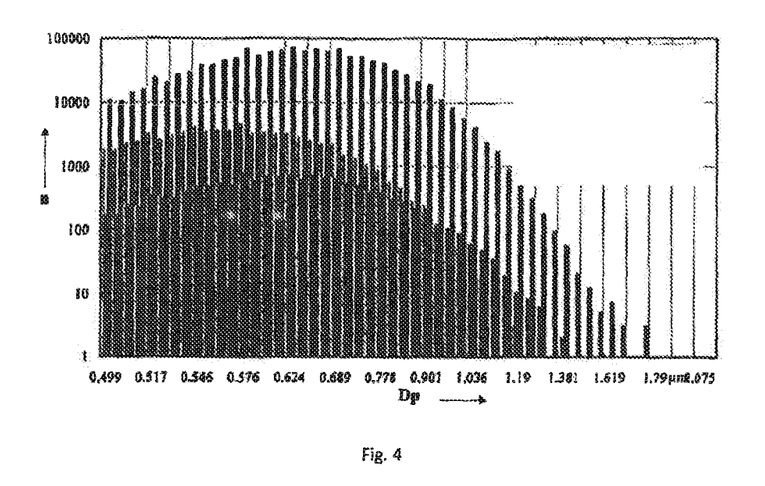

FIG. 4 shows a particle size distribution for various positions of the aerosol measurement. It can be derived from FIG. 4 that the frequency of particles in the aerosol increases with greater distance from the nozzle. From this, it can be derived that the particles must originate from a condensation/crystallisation process, wherein the crystallisation or the frequencies of particles increases with greater distance from the nozzle.

Since the probe was cooled to 18° C., as a result of which no water crystals could form, the measurement results clearly indicate the presence of aerosols that can be condensed or crystallised. The crystallisation product is to be attributed to an NMMO hydrate compound. The proportion of water in the NMMO monohydrate compound is only approximately 13%.

Due to the arrangement according to the invention of the treatment zones of the spinning fibres in the air gap and supply with corresponding flushing gas, the microclimate can be influenced and set in such a way that the nucleation or crystallisation of the NMMO hydrate compound (crystal compound) can be prevented or delayed in the region of the extrusion openings.

Severe cooling in the region of the air gap, but particularly immediately after the shaping, results in increased crystallisation of the previously evaporated NMMO hydrate immediately after the exit from the extrusion opening, whereby the crystallisation heat is introduced into the gas space and the released heat heats the gas space or consequently negatively influences the spinning process.

Results of the Aerosol Filter Sampling

It was found during the measurements that the material filtered from the spinning gas quickly blocks the filter pores of the PTFE filter membrane.

NMMO monohydrate as a crystallised produce could also be determined via tests carried out by light microscopy. These observations also correspond in so far as NMMO monohydrate crystallises and forms deposits, in the case of a continuously operating spinning device, in the flow-off region, but also in an onflow region not constructed optimally, particularly with use of open jet blasting. In any case, the deposition of crystals could be detected by conducting the spinning exhaust gas flow past a cooled metal surface, since the NMMO crystal forms can deposit on the cooled surface.

Example 2

Polymer Expansion Effects at Different Pressures

Flash evaporation of the spinning material occurs, at least for the water content of the pre-heated spinning solution at boiling temperature, due to the pressure reduction during the extrusion process.

It is assumed, based on the test results, that a certain segregation or separation of the homogeneous mixing phase at least at the polymer solution surface (extrudate surface) occurs as a result of the pressure relief during the spinning process caused by an expansion of the polymer. Two heterogeneous mixing phases, specifically the extrudate core formed from a homogeneous mixture of cellulose/amine oxide/water and the extrudate surface formed from an enrichment of amine oxide and water, for example in the form of crystallisation water, and/or water vapour mixed with thermal decomposition products (from amine oxide=NMM (N-methylmorpholine, M=morpholine)) are formed. This segregation may lead to the formation of a second phase in the extrudate. Due to nucleation and growth of crystal nuclei, this may lead to spinodal decomposition or the enrichment of polymer solution constituents at the boundaries of the dissolved polymer. It is in any case to be assumed that, due to this expansion process of the polymer solution jet, the fibrillary structure of the filaments formed in a fibre-like manner has already formed upon entry into the solvent-containing collecting bath (spinning bath) and the fibrils are only loosely connected via cellulose chains. A further segregation process therefore takes place in the spinning bath, since, due to the incompatibility with excess water supply, the polymer solution in the spinning bath experiences spontaneous spinodal decomposition and the looser cross-linking network of cellulose molecules formed additionally by the expansion evaporation is ripped open under the spinning bath swelling. Even with extrusion products such as filaments and staple fibres from a solution of cellulose/amine oxide/water, an increased fibrillation tendency can typically be detected on the finished, dry product, which can be attributed to the segregation and enrichment during the extrusion process.

In any case, the spinning solution is heated to a temperature above the boiling point in the air gap. The throttling of the "overheated" spinning solution flow introduced by the spinneret and expansion causes the spontaneous evaporation of NMMO/NMM/N/water at the filament surface in the gas space.

The flash evaporation observed in the spinning solution occurs since the pre-heated spinning material enters an environment of lower pressure, wherein the released quantity of solvent (mixture) implicitly functions on the one hand to cool the polymer flow exiting from the nozzle relief device. In other words, the pressure drop of the polymer flow (cellulose solution) from, for example, 20-50 bar to ambient pressure leads to an overheating of the polymer solution. The new pressure set in the shaped polymer solution spreads at high speed over the polymer material expanding in the air gap environment. At the same time, the pressure relief is accompanied by a change to the specific volume.

The temperature change is slowed by material transfers, such as heat transfers, at the phase boundary, with the result that it is to be assumed that a thermodynamic equilibrium of the polymer solution or spinning solution is no longer present in the spun fibre.

In thermodynamics, the direct transition of a material from the gaseous state of matter to the solid state of matter is also referred to as resublimation.

No liquid state of matter exists with the pressure and temperature conditions under which resublimation occurs. These conditions are also referred to, independently of the direction of the phase conversion, as sublimation pressure and sublimation temperature, or as the sublimation point.

Any substance, during the course of its resublimation, releases what is known as sublimation heat, which is equal to the sum of melting heat and evaporation heat.

The pressure relief and change to the thermal economy (heat tone effects) of the spinning solution were examined experimentally as follows.

To examine the heat tone effects, the spinning solution was passed through a pressure DSC equipped with sensors and liquid nitrogen cooling in a perforated crucible and was subjected to the following temperature program.

Heating: 30° C. to 300° C., heating rate 10° C./min; atmosphere nitrogen, test pressure: 1, 25, 50, 100 and 150 bar.

Figure 5:
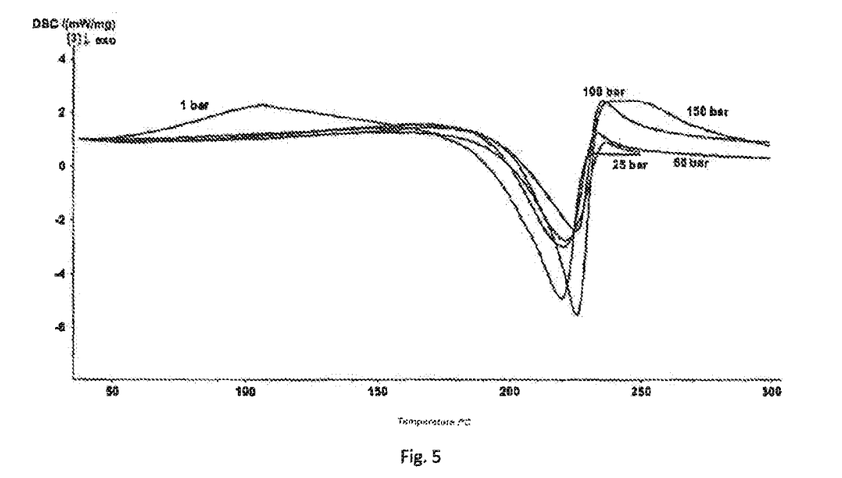
FIG. 5 shows examinations of the heat tone of cellulose/amine oxide/water mixtures, as also occur in the spinning field, at different temperatures and pressures. An exothermic decomposition reaction is initiated at all pressures from a temperature of approximately 190° C. Surprisingly, an endothermic process, which is absent at higher pressures, appears at 1 bar in the range from 60° C. to 150° C. with a maximum at 105° C. to 110° C. This can be attributed to rearrangements in the crystal structure of the spinning solution and to evaporation processes, which indicate a delivery or absorption of heat from/into the polymer solution and the substances released respectively.

The test results at various test pressures are illustrated in FIG. 5. It can be seen from FIG. 5, carried out at a measuring pressure of 1 bar, that a process progressing endothermically occurs from approximately 58-60° C. The peak temperature of the endothermic process lies between 105 and 110° C.

This endothermic effect clearly describes the fact that shifts in the crystal structure of the spinning solution occur in the range from 60° C. or evaporation processes are also introduced, which indicate heat delivery and absorption from/into the polymer solution and the released substances respectively. As a result of a further heat feed, the exothermic decomposition of the spinning material is initiated from 190° C.

At the higher pressures of 25, 50, 100 and 150 bar, it can be seen that the endothermic effect of the spinning solution is supressed in the temperature range 60 to 150° C. and is shifted to higher temperatures. A reason for this behaviour can be clearly cited as the pressure with the evaporation of the components located in the spinning solution. It is also interesting that the exothermic reactions of the spinning solution introduced at higher measuring temperatures occur to a smaller extent than with the 1 bar measurement.

Since the spinning process, due to the generated spinning pressure (function of the spinning solution concentration, the molecular weight (DP value, "degree of polymerisation", average degree of polymerisation of the cellulose) of the mass throughput, the viscosity, the temperature, the spinneret diameter, the spinneret length), is necessarily relieved of pressure to ambient pressure upon discharge (usual pressure range of 15-100 bar), it is clear from the measured enthalpy curve that, with the relief pressure difference before and after extrusion, the polymer solution is subjected to an endothermic effect. This effect is strongest at the peak maximum at 105° C. to 110° C. In accordance with the invention, this teaching is reversed in order to operate the extrusion spinning process at lower temperatures.

Example 3

Spinning Device

An NMMO spinning material consisting of a mixture of pulps of the MoDo Crown Dissolving-DP 510-550 and Sappi Saiccor DP 560-580 type was produced continuously in the following composition: cellulose 12.9%, amine oxide (NMMO-N-methylmorpholine N-oxide) 76.3%, water 10.8%.

The solution was produced following aqueous enzymatic pretreatment and suspension production by evaporating off excess water under vacuum in a reaction vessel subject to continuous flow at a temperature of 97-103° C. Known stabilisers were added in order to stabilise the NMMO/water solvent. As is known, the cellulose solution was stabilised using gallic acid propyl ester in alkaline spinning material and solvent. For safety-relevant solution production, it is advantageous for the heavy metal ion content to be controlled and not to exceed a value of 10 ppm as a cumulative parameter (of metal ions and non-ferrous metal ions). A pulp having a cellulose α (alpha) content of greater than 90% is preferably used for the solution production (α content determined as unsoluble fraction in 17.5% NaOH). The carbonyl group content of the used pulp was <0.1%. The carboxyl group content of the pulp likewise fluctuated in the region of <0.1%. It should be noted that the alkaline and alkaline earth ion content in the pulp is <350 ppm. The density of the produced solution was 1,200 kg/m$^3$ at room temperature. The zero shear viscosity of the spinning material, set via the pulp mixing components, may be up to 15,000 Pas, measured at 75° C. Depending on the processing temperature selected in the spinning process, the zero shear viscosity may fluctuate in the range from 500 to 15,000 Pas. Due to the shear-thinning behaviour of the spinning solution, the viscosity at spinning shear rates falls, depending on the selected processing temperature, to a range below 100 Pas and is likewise highly dependent on the cellulose concentration in the spinning solution.

An NMMO solution was used as the spinning bath necessary for the spinning process, wherein the NMMO concentration was held in the range between 18 and 23% and at a temperature from 15 to 28° C. by the addition of aqueous condensate. The metal cations and non-ferrous metal cations located in the spinning bath had a concentration of <0.25 mg/l. The alkaline and earth alkaline concentration in the spinning bath ranged from 30 to 50 mg/l.

The spun spinning solution as described above was subjected to a test program in accordance with accompanying Table 1.

A rectangularly drilled nozzle metal sheet (material highgrade steel) of different thickness was used as a spinneret. The spinneret openings were formed in the manner of capillary bores in the nozzle metal sheet. A geometry for the bore hole form was used with which the spinning solution runs in a conical part into the spinning hole and, after the conical part, is conducted into a cylindrical part of the bore hole before the spinning material is pressed out into the air gap with simultaneous drawing, was used as the bore hole form. The material drawn into fibrils was then dipped into the spinning bath for solidification and ultimate fibre formation.

The spinneret openings were held at a temperature, as stated in example Table 1.

The air gap between the spinneret openings and the spinning bath surface constitutes the spinning gas volume. The spinning gas volume is formed from the spinning field and the gas gap height associated with the spinning field.

The spinning fibres passed transversely through the temperature-layered gas space (spinning volume), wherein they were passed continuously in this gas space through the spinning gas flow 1 and the spinning gas flow 2 during the spinning process. Test 8 and Test 9 were carried out without the feed of a spinning gas flow 2.

The fibre formation or coagulation of the drawn cellulose solution was then performed in the spinning bath, which was attached beneath the spinneret openings.

The drawn fibres exiting from the spinning bath were removed continuously by means of a discharge member.

During the tests, the spinning gas exhaust gas flow was measured on the flow-off side of the spinning field for aerosol particles, wherein the particle size and concentration are illustrated in Table 1 in accordance with each test.

It could surprisingly be determined that it is possible to detect a dependency of the aerosol particles released from the cellulose solution via the variation of the spinning pressure and the spinning temperature. A release of aerosol particles induced by temperature and spinning pressure could thus be determined, wherein a lower aerosol release could be determined in the spinning temperature range between 87° C. and 94° C. at a spinning pressure between 22 and 34 bar (tests 5, 6 and 7).

The spinning behaviour was additionally determined visually, under consideration of the number of spinning errors, such as fibre breaks and adhesions. The spinning behaviour was classified from 1 (best) to 5 (worst), wherein the method according to the invention demonstrated the best behaviour in accordance with tests 5, 6 and 7.

If the spinning solution had the same composition over all tests, but was spun at higher spinning temperatures and spinning pressures, a much higher aerosol particle concentration can be determined in the gas flow through which the spinning material is passed. Since the aerosol particles crystallised already at temperatures of 20° C., the detected particles can only be assumed to be NMMO 2,5 hydrate, NMMO 1 hydrate or pure NMMO discharged during the spinning process as a result of expansion evaporation. The aerosol particles can also be easily detected, besides the aerosol measurement by means of a measuring apparatus, by deposition on a cooled depositing plate arranged after the spinning field. Besides the crystallised amine oxide (NMMO hydrate), NMMO-typical decomposition products (which are produced during production of the spinning material), such as NMM (N-methylmorpholine), M (morpholine) and other solution-specific degradation products, can also be separated from the spinning material.

| | | Test 1 | Test 2 | Test 3 | Test 4 | Test 5 | Test 6 | Test 7 | Test 8 |
|---|---|---|---|---|---|---|---|---|---|
| Spinning solution temperature | ° C. | 105 | 107 | 110 | 109 | 92 | 87 | 94 | 112 |
| Throughput per hole | g/hole min | 0.025 | 0.025 | 0.050 | 0.050 | 0.025 | 0.034 | 0.025 | 0.050 |
| Diameter | mm | 0.100 | 0.100 | 0.100 | 0.100 | 0.070 | 0.080 | 0.070 | 0.070 |
| Nozzle length | mm | 1.00 | 1.50 | 1.00 | 1.50 | 1.00 | 1.50 | 1.50 | 1.00 |
| Spinning fibre discharge rate | | | | | | | | | |
| Titre | dtex | 1.40 | 1.42 | 1.41 | 1.39 | 1.43 | 1.38 | 1.40 | 1.43 |
| Discharge rate | m/min | 27.9 | 27.9 | 55.7 | 55.7 | 27.9 | 38.5 | 27.9 | 55.7 |
| spec. hole density | fibres/mm² | 3 | 3 | 2.5 | 2.5 | 3 | 3 | 3 | 2.5 |
| Cross-sectional area of holes (fibres) at the nozzle discharge without the swell per mm² of nozzle area | | 0.024 | 0.024 | 0.020 | 0.020 | 0.012 | 0.015 | 0.012 | 0.010 |
| Cross-sectional area of the filaments at the end of drawing | | 0.00035 | 0.00036 | 0.00035 | 0.00035 | 0.00036 | 0.00035 | 0.00035 | 0.00036 |
| Averaged filament cross-sectional area per mm² of nozzle area | | 0.010 | 0.010 | 0.008 | 0.008 | 0.005 | 0.006 | 0.005 | 0.004 |
| Volume of the filaments with full discharge area, cylindrical | | 0.589 | 0.589 | 0.491 | 0.491 | 0.289 | 0.377 | 0.289 | 0.241 |
| Volume of the filaments with averaged filament cross-sectional area | | 0.239 | 0.239 | 0.199 | 0.199 | 0.118 | 0.154 | 0.118 | 0.099 |
| Spinning field volume/per mm of nozzle width | mm³/mm | 25 | 50 | 25 | 25 | 25 | 25 | 25 | 25 |
| Spinning gas volume in the spinning field = spinning field volume minus volume of filaments with averaged discharge area | mm³ | 24.761 | 49.761 | 24.801 | 24.801 | 24.882 | 24.846 | 24.882 | 24.901 |
| Ratio of spinning field total volume/averaged fibre volume | factor | 104.809 | 209.581 | 125.451 | 125.477 | 211.096 | 162.689 | 211.208 | 252.048 |
| Fibre volume in % of spinning field total volume | % | 0.954 | 0.477 | 0.797 | 0.797 | 0.474 | 0.615 | 0.473 | 0.397 |
| Number of spinning fields in the gas flow direction | | 20,000 | 20,000 | 20,000 | 20,000 | 20,000 | 20,000 | 20,000 | 20,000 |
| spec. spinning gas flow 1 feed over number of spinning fields | liters/h per mm of spinneret length | 150 | 250 | 275 | 280 | 60 | 60 | 60 | 250 |
| spec. spinning gas flow 2 feed over number of spinning fields | liters/h per mm of spinneret length | 125 | 50 | 25 | 30 | 100 | 100 | 100 | 0 |
| spec. spinning gas treatment flow 1 | liters/h per spinning field | 7.5 | 12.5 | 13.8 | 14.0 | 3.0 | 3.0 | 3.0 | 12.5 |
| spec. spinning gas treatment flow 2 | liters/h per spinning field | 6.25 | 2.50 | 1.25 | 1.50 | 5.00 | 5.00 | 5.00 | — |

-continued

| | | | | | | | | | |
|---|---|---|---|---|---|---|---|---|---|
| Measured particle concentration in the spinning exhaust gas flow | field µg/m³ | 2.80E+04 | 3.20E+04 | 3.35E+04 | 3.05E+04 | 2.98E+04 | 3.20E+04 | 3.47E+04 | 3.38E+04 |
| Spinning gas flow feed per mm³ of spinning field volume | liters/h per mm³ of spinning field | 0.55 | 0.30 | 0.60 | 0.62 | 0.32 | 0.32 | 0.32 | 0.50 |
| | conc. = removal in µg/h per mm³ of spinning field | | | | | | | | |
| Number of air changes in the spinning field | | 15 | 10 | 20 | 19 | 10 | 10 | 11 | 17 |
| Spinning behaviour | | 5.50E+05 | 3.00E+05 | 6.00E+05 | 6.20E+05 | 3.20E+05 | 3.20E+05 | 3.20E+05 | 5.00E+05 |
| | | 2 | 2 | 2-3 | 2-3 | 1-2 | 1-2 | 1-2 | 2-3 |

| | | Test 9 | Test 10 | Test 11 | Test 12 | Test 13 |
|---|---|---|---|---|---|---|
| Spinning solution temperature | °C. | 114 | 117 | 119 | 121 | 124 |
| Throughput per hole | g/hole min | 0.050 | 0.025 | 0.025 | 0.050 | 0.050 |
| Diameter | mm | 0.070 | 0.050 | 0.050 | 0.050 | 0.050 |
| Nozzle length | mm | 1.50 | 1.00 | 1.50 | 1.00 | 1.50 |
| Spinning fibre discharge rate | | | | | | |
| Titre | dtex | 1.42 | 1.40 | 1.41 | 1.44 | 1.42 |
| Discharge rate | m/min | 55.7 | 27.9 | 27.9 | 55.7 | 55.7 |
| spec. hole density | fibres/mm² | 2.5 | 3 | 3 | 2.5 | 2.5 |
| Cross-sectional area of holes (fibres) at the nozzle discharge without the swell per mm² of nozzle area | | 0.010 | 0.006 | 0.006 | 0.005 | 0.005 |
| Cross-sectional area of the filaments at the end of drawing | | 0.00036 | 0.00035 | 0.00035 | 0.00036 | 0.00036 |
| Averaged filament cross-sectional area per mm² of nozzle area | | 0.004 | 0.002 | 0.002 | 0.002 | 0.002 |
| Volume of the filaments with full discharge area, cylindrical | | 0.241 | 0.147 | 0.147 | 0.123 | 0.123 |
| Volume of the filaments with averaged filament cross-sectional area | | 0.099 | 0.062 | 0.062 | 0.052 | 0.052 |
| Spinning field volume/per mm of nozzle width | mm³/mm | 25 | 25 | 25 | 25 | 25 |
| Spinning gas volume in the spinning field = spinning field volume minus volume of filaments with averaged discharge area | mm³ | 24.901 | 24.938 | 24.938 | 24.943 | 24.948 |
| Ratio of spinning field total volume/averaged fibre volume | factor | 252.101 | 404.401 | 404.265 | 479.976 | 480.360 |
| Fibre volume in % of spinning field total volume | % | 0.397 | 0.247 | 0.247 | 0.208 | 0.208 |
| Number of spinning fields in the gas flow direction | | 20,000 | 20,000 | 20,000 | 20,000 | 20,000 |

-continued

| | | | | | | |
|---|---|---|---|---|---|---|
| spec. spinning gas flow 1 feed over number of spinning fields | liters/h per mm of spinneret length | 275 | 250 | 250 | 275 | 350 |
| spec. spinning gas flow 2 feed over number of spinning fields | liters/h per mm of spinneret length | 0 | 25 | 25 | 75 | 75 |
| spec. spinning gas treatment flow 1 | liters/h per spinning field | 13.8 | 12.5 | 12.5 | 13.8 | 17.5 |
| spec. spinning gas treatment flow 2 | liters/h per spinning field | — | 1.25 | 1.25 | 3.75 | 3.75 |
| Measured particle concentration in the spinning exhaust gas flow | µg/m³ | 3.86E+04 | 3.65E+04 | 4.50E+04 | 4.18E+04 | 4.95E+04 |
| Spinning gas flow feed per mm³ of spinning field volume | liters/h per mm³ of spinning field | 0.55 | 0.55 | 0.55 | 0.70 | 0.85 |
| | conc. = removal in µg/h per mm³ of spinning field | 21 | 20 | 25 | 29 | 42 |
| Number of air changes in the spinning field | | 5.50E+05 | 5.50E+05 | 5.50E+05 | 7.00E+05 | 8.50E+05 |
| Spinning behaviour | | 2-3 | 3-4 | 3-4 | 4 | 4 |

The invention claimed is:

1. A method for producing solid cellulosic shaped articles, or films, from a solution of cellulose, NMMO (N-methylmorpholine N-oxide) and water, comprising:
   extruding the solution through one or more extrusion openings under pressure and solidifying said articles, or films, in a collecting bath, wherein a length of the solution extends between the extrusion openings and the collecting bath; and
   guiding the solution through an air gap with a gas flow between the extrusion openings and the collecting bath, the temperature of the solution at the extrusion openings is below 105° C. and the pressure difference between the pressure of the solution immediately before extrusion and after extrusion in the air gap is between 8 and 40 bar, wherein the gas flow is guided against the entire length of the solution extending between the extrusion openings and the collecting bath by a fan and an additional flow guide element.

2. The method according to claim 1, wherein the temperature of the solution is between 80° C. and 98° C.

3. The method according to claim 1, wherein the pressure difference is between 16 bar and 38 bar.

4. The method according to claim 1, wherein the pressure immediately before extrusion is between 13 and 50 bar.

5. The method according to claim 1, wherein the pressure after extrusion in the air gap is between 0.5 bar and 3 bar.

6. The method according to claim 1, further comprising guiding a lateral gas flow in the air gap.

7. The method according to claim 6, wherein the gas flow is between 30 to 300 liters/h of gas per mm of length of the region of the extrusion openings in the gas flow direction or is between 0.15 and 20 liters/h of gas per $mm^3$ of spinning field volume in the air gap.

8. The method according to claim 6, wherein the region between the extrusion openings and the collecting bath is flushed substantially completely by the gas flow.

9. The method according to claim 6, wherein the gas flow is laminar.

10. The method according to claim 6, further comprising a plurality of extrusion openings provided in the direction of the gas flow.

11. The method according to claim 6, wherein a partial flow of the gas flow is heated by one of an extrusion plate comprising the extrusion openings or by a heating element in the fan.

12. The method according to claim 1, wherein said articles are selected from cellulose filaments, cellulose staple fibres, cellulose non-woven articles or cellulose films.

13. The method according to claim 1, wherein one or more components solubilising the cellulose are separated from the extruded solution by the gas flow.

14. The method according to claim 13, wherein the components separated by means of the gas flow are discharged from the spinning field on a flow-off side.

15. The method according to claim 14, wherein the components discharged from the spinning field on the flow-off side are crystallised.

16. A method for producing solid cellulosic shaped articles, or films, from a solution of cellulose, NMMO (N-methylmorpholine N-oxide) and water, comprising:
   extruding the solution through one or more extrusion openings under pressure and solidifying said articles, or films, in a collecting bath, wherein a length of the solution extends between the extrusion openings and the collecting bath; and
   guiding the solution through an air gap with a gas flow directed toward the entire length of the solution extending between the extrusion openings and the collecting bath by a fan and an additional flow guide element, the temperature of the solution at the extrusion openings is below 105° C. and the pressure difference between the pressure of the solution immediately before extrusion and after extrusion in the air gap is between 8 and 40 bar so that NMMO particle formation in the air gap is reduced.

* * * * *